(12) United States Patent
Chang et al.

(10) Patent No.: US 11,258,790 B2
(45) Date of Patent: Feb. 22, 2022

(54) LARGE SCALE AND HIGH THROUGHPUT VIDEO IDENTITY MONITORING AND VERIFICATION

(71) Applicant: Intuit Inc., Mountain View, CA (US)

(72) Inventors: Jianxiang Chang, Mountain View, CA (US); Yan Qu, Los Altos, CA (US); Srividya Narayanan, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 106 days.

(21) Appl. No.: 16/726,078

(22) Filed: Dec. 23, 2019

(65) Prior Publication Data

US 2021/0194872 A1 Jun. 24, 2021

(51) Int. Cl.
*H04L 29/06* (2006.01)
*H04L 12/18* (2006.01)
*G06K 9/00* (2022.01)

(52) U.S. Cl.
CPC ...... *H04L 63/0861* (2013.01); *G06K 9/00281* (2013.01); *H04L 12/1818* (2013.01); *H04L 12/1822* (2013.01); *H04L 12/1895* (2013.01)

(58) Field of Classification Search
CPC ............. H04L 63/0861; H04L 12/1822; H04L 12/1895; G06K 9/00281; G06K 9/00288; G06K 9/00255; G06K 9/00295; G06K 9/00302; H04N 7/15
See application file for complete search history.

(56) References Cited

U.S. PATENT DOCUMENTS

| 10,108,851 | B2* | 10/2018 | Bandameedipalli ........................ G06Q 10/105 |
| 2015/0189233 | A1* | 7/2015 | Carpenter ............... H04N 7/15 348/14.08 |
| 2019/0311102 | A1* | 10/2019 | Tussy ...................... G06F 21/32 |
| 2021/0141888 | A1* | 5/2021 | Hires ....................... G06F 21/32 |
| 2021/0144338 | A1* | 5/2021 | Astarabadi .............. G06T 17/00 |

OTHER PUBLICATIONS

Mallikarjun B R, V. Chari and C. V. Jawahar, "Efficient face frontalization in unconstrained images," 2015 Fifth National Conference on Computer Vision, Pattern Recognition, Image Processing and Graphics (NCVPRIPG), 2015, pp. 1-4, doi: 10.1109/NCVPRIPG.2015.7490057.*

Gupta, S., Sahoo, O.P., Goel, A., & Gupta, R. (2010). A New Optimized Approach to Face Recognition Using EigenFaces. Global journal of computer science and technology, 10.*

* cited by examiner

Primary Examiner — Chirag R Patel
(74) Attorney, Agent, or Firm — Paradice and Li LLP (57) ABSTRACT

Systems and methods for verifying identifies of parties to a video conference call are disclosed. An example method includes storing a plurality of first facial encodings each associated with one or more images of a registered agent, receiving, during the video conference call, a second facial encoding associated with one or more images of a person participating in the video conference call, determining that a specified registered agent is scheduled as a party to the video conference call, comparing the second facial encoding to a selected first facial encoding associated with the specified registered agent, and determining, based at least in part on the comparing, whether or not the person is the specified registered agent.

20 Claims, 6 Drawing Sheets

```
┌─────────────────────────────────────────────────────────────┐
│ Store a plurality of first facial encodings in a database,  │
│ each of the plurality of first facial encodings associated  │
│ with one or more images of a corresponding registered       │
│ agent. (502)                                                │
└─────────────────────────────────────────────────────────────┘
                              │
                              ▼
┌─────────────────────────────────────────────────────────────┐
│ Receive, during a video conference call, a second facial    │
│ encoding corresponding to one or more images of a person    │
│ participating in the video conference call. (504)           │
└─────────────────────────────────────────────────────────────┘
                              │
                              ▼
┌─────────────────────────────────────────────────────────────┐
│ Determine that a specified registered agent is scheduled    │
│ as a party to the video conference call. (506)              │
└─────────────────────────────────────────────────────────────┘
                              │
                              ▼
┌─────────────────────────────────────────────────────────────┐
│ Identify the first facial encoding of the plurality of      │
│ first facial encodings corresponding to the specified       │
│ registered agent. (508)                                     │
└─────────────────────────────────────────────────────────────┘
                              │
                              ▼
┌─────────────────────────────────────────────────────────────┐
│ Compare the second facial encoding to the identified first  │
│ facial encoding. (510)                                      │
└─────────────────────────────────────────────────────────────┘
                              │
                              ▼
┌─────────────────────────────────────────────────────────────┐
│ Determine whether the person participating in the video     │
│ conference call is the specified registered agent based at  │
│ least in part on the comparing. (512)                       │
└─────────────────────────────────────────────────────────────┘
```

At Agent Device 230

Capture one or more images of a person participating in a video conference call. (602)

Transform the one or more captured images into a second facial encoding. (604)

Transmit the second facial encoding to a verification system. (606)

At Verification System 100

Store a plurality of first facial encodings each associated with one or more images of a corresponding registered agent. (608)

Receive the second facial encoding during the video conference call. (610)

Determine that a specified registered agent is scheduled as a party to the video conference call. (612)

Identify the first facial encoding of the plurality of first facial encodings corresponding to the specified registered agent. (614)

Compare the second facial encoding to the identified first facial encoding. (616)

Determine whether the person is the specified registered agent based at least in part on the comparing. (618)

FIG. 6

LARGE SCALE AND HIGH THROUGHPUT VIDEO IDENTITY MONITORING AND VERIFICATION

TECHNICAL FIELD

This disclosure relates generally to methods for monitoring and verifying identities, and more specifically to monitoring and verifying identities of registered users of a video conference system using facial recognition.

DESCRIPTION OF RELATED ART

Increasingly, companies and institutions are employing video conferencing systems to facilitate interactions with customers and the public. The conduct of its representatives during such interactions may reflect on the company or institution's reputation, and may even generate potential liabilities, for example, based on the representatives' erroneous advice, disparaging remarks towards a customer, or other misconduct. Additionally, operating such video conferencing systems at large scale may require the use of a substantial amount of limited computing resources. Therefore, it may be important for the company or institution to efficiently allocate computing resources to verify the identity of its representatives during such video conferences.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for verifying identities of parties to a video conference call. The method may be performed by one or more processors of a verification system, and may include storing a plurality of first facial encodings in a database, each of the plurality of first facial encodings associated with one or more images of a corresponding registered agent of a plurality of registered agents, receiving, during the video conference call, a second facial encoding associated with one or more images of a person participating in the video conference call, determining that a specified registered agent is scheduled as a party to the video conference call, identifying the first facial encoding of the plurality of first facial encodings corresponding to the specified registered agent, comparing the second facial encoding to the identified first facial encoding, and determining whether the person is the specified registered agent based at least in part on the comparing.

In some implementations, each of the plurality of first facial encodings may be based at least in part on determined positions of a number of ordered facial landmarks extracted from the one or more images of the corresponding registered agent, and the second facial encoding may be based at least in part on determined positions of a number of ordered facial landmarks extracted from the one or more images of the person participating in the video conference call. In some aspects, each of the plurality of first facial encodings may be based on a normalized vector comprising the determined positions of the number of ordered facial landmarks extracted from the one or more images of the corresponding registered agent, and the second facial encoding may be based on a normalized vector comprising the determined positions of the number of ordered facial landmarks extracted from the one or more images of the person participating in the video conference call. In one or more implementations, determining whether the person is the specified registered agent may include determining a distance between a normalized vector corresponding to the second facial encoding and a normalized vector corresponding to the identified first facial encoding.

In some implementations, the method may also include generating an alert in response to determining that the person is not the specified registered agent. The alert may include at least one of the one or more images of the person, an IP address of the person, or an identifier of the device with which the person used to participate in the video conference call. In some aspects, the alert may flag the video conference call for human verification that the person is the specified registered agent. The alert may be generated by receiving, from the person's device, the one or more images of the person and including the one or more received images in the alert.

Another innovative aspect of the subject matter described in this disclosure can be implemented in a verification system. The verification system may include one or more processors coupled to a memory. The memory may store instructions that, when executed by the one or more processors, cause the verification system to perform a number of operations. In some implementations, the number of operations may include storing a plurality of first facial encodings in a database, each of the plurality of first facial encodings associated with one or more images of a corresponding registered agent of a plurality of registered agents, receiving, during the video conference call, a second facial encoding associated with one or more images of a person participating in the video conference call, determining that a specified registered agent is scheduled as a party to the video conference call, identifying the first facial encoding of the plurality of first facial encodings corresponding to the specified registered agent, comparing the second facial encoding to the identified first facial encoding, and determining whether the person is the specified registered agent based at least in part on the comparing.

In some implementations, each of the plurality of first facial encodings may be based at least in part on determined positions of a number of ordered facial landmarks extracted from the one or more images of the corresponding registered agent, and the second facial encoding may be based at least in part on determined positions of a number of ordered facial landmarks extracted from the one or more images of the person participating in the video conference call. In some aspects, each of the plurality of first facial encodings may be based on a normalized vector comprising the determined positions of the number of ordered facial landmarks extracted from the one or more images of the corresponding registered agent, and the second facial encoding may be based on a normalized vector comprising the determined positions of the number of ordered facial landmarks extracted from the one or more images of the person participating in the video conference call. In one or more implementations, determining whether the person is the specified registered agent may include determining a distance between a normalized vector corresponding to the second facial encoding and a normalized vector corresponding to the identified first facial encoding.

In some implementations, execution of the instructions may cause the verification system to generate an alert in response to determining that the person is not the specified registered agent. The alert may include at least one of the one or more images of the person, an IP address of the person, or an identifier of the device with which the person used to participate in the video conference call. In some aspects, the alert may flag the video conference call for human verification that the person is the specified registered agent. The alert may be generated by receiving, from the person's device, the one or more images of the person and including the one or more received images in the alert.

Another innovative aspect of the subject matter described in this disclosure can be implemented in a video conference system. The video conference system may include a video capture device and verification system. The video capture device may be configured to capture one or more images of a person participating in a video conference call and to transform the one or more captured images into a second facial encoding. The verification system may be configured to store a plurality of first facial encodings in a database, each of the plurality of first facial encodings associated with one or more images of a corresponding registered agent of a plurality of registered agents; receive the second facial encoding from the video capture device during the video conference call; determine that a specified registered agent is scheduled as a party to the video conference call; identify the first facial encoding of the plurality of first facial encodings corresponding to the specified registered agent; compare the second facial encoding to the identified first facial encoding; and determine whether the person is the specified registered agent based at least in part on the comparing.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Implementations of the subject matter described in this disclosure may be used to efficiently verify identifies of parties to a video conference call without requiring the transmission of images or video captured during the video conference call for verification. In accordance with various aspects of the present disclosure, identity verification systems are disclosed that store a plurality of first facial encodings corresponding to a plurality of registered agents of a company or service. Each of the plurality of first facial encodings may be derived from one or more images of a corresponding one of the plurality of registered agents, and may be used to verify the identity of a person purporting to be a specified registered agent during a video conference call with a customer or client of the company. In some implementations, one or more images of the person purporting to be the specified registered agent may be captured during the video conference call, transformed into a second facial encoding indicative of a number of facial features of the person, and then transmitted to the verification system.

The verification system may identify the first facial encoding corresponding to the specified registered agent, and may compare the received second facial encoding to the identified first facial encoding to determine whether the person purporting to be the specified registered agent is, in fact, the specified registered agent. Because the facial encodings of the person purporting to be the specified registered agent are much smaller in size than captured images or video of the person, video conference systems incorporating various aspects of the identity verification systems disclosed herein may be scaled to a greater extent, while consuming less bandwidth and memory resources, than conventional video conference systems that transmit live images or video captured during video conference calls to a verification service for identity verification. Thus, by transforming the one or more images of the person purporting to be the specified registered agent into the second facial encoding and transmitting the second facial encoding to the identity verification system, rather than transmitting live images or video of the person captured during the video conference call, implementations of the subject matter disclosed herein may reduce the bandwidth and memory resources associated with verifying the identities of parties to video conference calls.

Various implementations of the subject matter disclosed herein provide one or more technical solutions to the technical problem of efficiently verifying identities of parties to a video conference call. More specifically, various aspects of the present disclosure provide a unique computing solution to a unique computing problem that did not exist prior to electronic or online identity verification systems that can verify the identities of registered agents associated with a company in real time during video conference calls with customers or clients of the company. By reducing the transmission bandwidth and memory resources associated with real-time identity verification during video conference calls, implementations of the subject matter disclosed herein provide meaningful improvements to the performance and scalability of identity verification systems. As such, implementations of the subject matter disclosed herein are not an abstract idea such as organizing human activity or a mental process that can be performed in the human mind, for example, because the human mind is not capable of transforming one or more captured images or video into facial encodings that consume only a fraction of the computer memory needed to store the one or more captured images or video, much less transmitting the facial encodings to an identity verification system.

Moreover, various aspects of the present disclosure effect an improvement in the technical field of real-time identity verification of parties to video conference calls. The described verification of identities of registered agents associated with a company while participating in video conference calls cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

Figure 1:
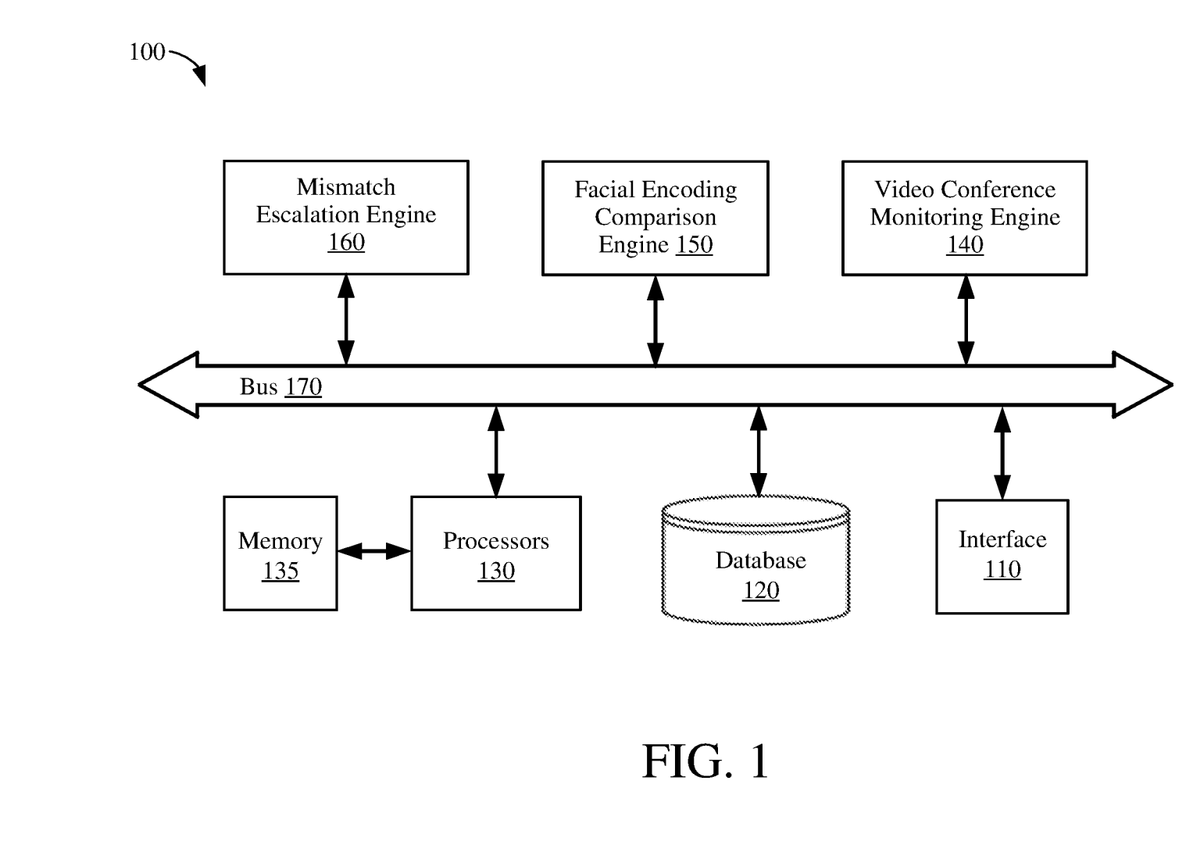
FIG. 1 shows an identity verification system, according to some implementations.

FIG. 1 shows an identity verification system 100, according to some implementations. Various aspects of the verification system 100 disclosed herein may be applicable for verifying identifies of registered agents associated with a company in real time during video conference calls with customers or clients of the company. For example, the verification system 100 may be used to determine whether facial encodings of persons purporting to be registered agents of the company match or correspond to stored facial encodings indicative of a number of facial features of each of a plurality of registered agents of the company. The company may be any suitable entity that provides customer service using video conference calls during which registered agents of the company may interact with customers or clients of the company.

The verification system 100 is shown to include an input/output (I/O) interface 110, a database 120, one or more data processors 130, a memory 135 coupled to the one or more data processors 130, a video conference monitoring engine 140, a facial encoding comparison engine 150, and a mismatch escalation engine 160. In some implementations, the various components of the verification system 100 may be interconnected by at least a data bus 170, as depicted in the example of FIG. 1. In other implementations, the various components of the verification system 100 may be interconnected using other suitable signal routing resources.

The interface 110 may include a screen, an input device, and other suitable elements that allow a user to provide information to the verification system 100 and/or to retrieve information from the verification system 100. Example information that can be provided to the verification system 100 may include facial encodings for one or more registered agents of the company and facial encodings received from persons participating in video conference calls and purporting to be registered agents of the company. Example information that can be retrieved from the verification system 100 may include one or more identity verifications, one or more alerts that a person participating in a video conference call is not identified as a registered agent of the company, one or more requests for a registered agent of the company to submit updated pictures for verification, and so on.

The database 120, which may represent any suitable number of databases, may store any suitable information pertaining to each of the registered agents of the company and/or associated with the verification system 100. The information for a particular registered agent may include facial encodings of the particular registered agent, identifying information of the particular registered agent, and related information of particular registered agent. The facial encodings may be indicative of a number of facial features of the particular registered agent. The identifying information may include one or more of images of the particular registered agent, phone numbers of the particular registered agent, email addresses of the particular registered agent, a physical mailing address of the particular registered agent, the social security number of the particular registered agent, one or more IP addresses associated with the particular registered agent, a device identifier (such as a MAC address) of the computing device with which the particular registered agent uses to participate in video conference calls, and so on. The related information may include transcripts, recordings, or other historical information relating to video conference calls previously conducted by the particular registered agent. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as comparing facial encodings stored in the database 120 with facial encodings generated from in-progress video conference calls), may be one or more suitable processors capable of executing scripts or instructions of one or more software programs stored in the verification system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration). In some implementations, the data processors 130 may be remotely located from one or more other components of identity verification system 100.

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The video conference monitoring engine 140 may be used to monitor in-progress video conference calls in order to determine whether or not persons participating in the video conference calls and purporting to be registered agents of the company are in fact registered agents of the company. For example, the video conference monitoring engine 140 may monitor participants in a video conference call (e.g., via one or more networks not shown for simplicity) and may receive facial encodings of participants purporting to be registered agents of the company (e.g., via the one or more networks). Further, the video conference monitoring engine 140 may send the received facial encodings to the facial encoding comparison engine 150 to verify the identities of persons purporting to be registered agents of the company.

The facial encoding comparison engine 150 may compare facial encodings received from the video conference monitoring engine 140 to stored facial encodings of verified registered agents of the company or video conference system. In some implementations, the facial encoding comparison engine 150 may receive, from the video conference monitoring engine 140, a facial encoding of a person purporting to be a specific registered agent of the company, and may compare the received facial encoding with the stored facial encoding of the specific registered agent. In some aspects, the facial encodings of the registered agents may be stored in the database 120. The facial encoding comparison engine 150 may generate a comparison metric based on the comparison between the received facial encoding and the stored facial encoding of the specific registered agent. If the generated comparison metric indicates at least a threshold amount of similarity between the received facial encoding and the stored facial encoding, the facial encoding comparison engine 150 may determine that the received facial encoding is consistent with the stored facial encoding of the specific registered agent, and verify that the participant in the video conference call purporting to be the specific registered agent is, in fact, the specific registered agent. If the generated comparison metric does not indicate the at least threshold amount of similarity between the received facial encoding and the stored facial encoding of the specific registered agent, the facial encoding comparison engine 150 may determine that the received facial encoding is inconsistent with the stored facial encoding of the specific registered agent, and may provide an alert or notification to the mismatch escalation engine 160.

The mismatch escalation engine 160 may respond to alerts or notifications provided by the facial encoding comparison engine 150 by performing one or more escalations. More specifically, in response to determining that a received facial encoding does not correspond to or identify the specific registered agent, the mismatch escalation engine 160 may generate an alert. The alert may include relevant information about the specific registered agent, such as one or more images of the specific registered agent (such as stored in database 120), one or more previously used IP addresses of the specific registered agent, one or more device identifiers of the specific registered agent, and so on.

The alert may also include relevant information to the in-progress video conference call, such as one or more images associated with the received facial encoding purporting to be the specific registered agent, an IP address from which the received facial encoding was sent (which may be used to identify a location of the person pretending to be the specific registered agent), a device identifier from which the received facial encoding was sent (which may be used to identify the person pretending to be the specific registered agent), and so on. In some implementations, the one or more images associated with the received facial encoding may be requested from the agent's device in response to the potential mismatch and provided within the alert. In some implementations, the generated alert may flag the potential mismatch for human review. In such implementations, the mismatch escalation engine 160 may send information about the specific registered agent and the in-progress video conference call, along with the alert, to a dashboard or a review console for human review. In some implementations, an escalation may increment a counter which records a number of potential mismatches associated with the specific registered agent. If this counter reaches a threshold number of potential mismatches, the specific registered agent may be prompted to submit one or more new facial images from which an updated facial encoding may be generated and stored in the database 120, for example, to ensure that the stored facial encodings accurately depict current facial features of the specific registered agent.

In some other implementations, an escalation may also record or update a recent similarity metric. The recent similarity metric may record one more recently measured similarity metrics for the specific registered agent. Such a recent similarity metric may also prompt the specific registered user to submit one or more images for updating the facial encoding stored in the database 120. For example, if the recent similarity metric is determined to indicate less than a threshold degree of similarity, the specific registered user may be prompted to submit updated images even if the potential mismatch is determined to be in error.

The particular architecture of the verification system 100 shown in FIG. 1 is but one example of a variety of different architectures within which aspects of the present disclosure may be implemented. For example, in other implementations, the verification system 100 may not include a video conference monitoring engine 140, the functions of which may be implemented by the processors 130 executing corresponding instructions or scripts stored in the memory 135. In some other implementations, the functions of the facial encoding comparison engine 150 may be performed by the processors 130 executing corresponding instructions or scripts stored in the memory 135. Similarly, the functions of the mismatch escalation 160 may be performed by the processors 130 executing corresponding instructions or scripts stored in the memory 135. In some other examples, the verification system 100 may be implemented as software as a service (SaaS), or as managed software as a service (MSaaS). For example, when implemented as SaaS or MSaaS the functions of the verification system 100 may be centrally hosted and may be accessed by users using a thin client, such as a web browser.

Figure 2:
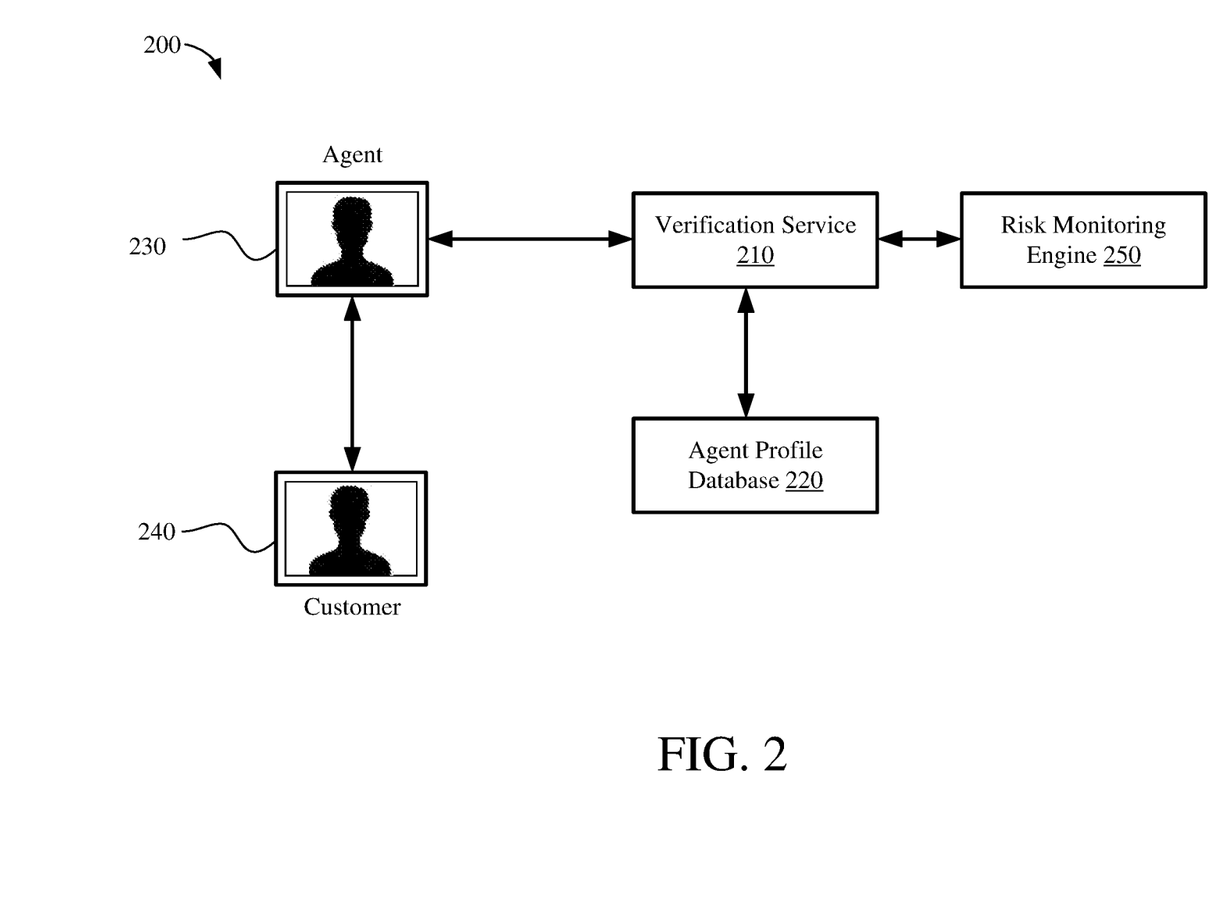
FIG. 2 shows an example video conference system, according to some example implementations.

FIG. 2 shows an example video conference system 200, according to some example implementations. The video conference system 200 may include an identity verification system 210, an agent profile database 220, an agent device 230, a customer device 240, and a risk monitoring engine 250. As shown with respect to FIG. 2, the verification system 210 may be coupled to the agent profile database 220. In some implementations, the verification system 210 may be one example of the verification system 100 of FIG. 1. Further, while the agent profile database 220 is shown as separate from the verification system 210, in some implementations, the agent profile database 220 may be incorporated within the verification system 210, for example, in the database 120 of FIG. 1. The agent profile database 220 may store one or more facial encodings associated with each of the plurality of registered agents associated with the company, may store identifying information for each of the plurality of registered agents (such as one or more images of the registered agents, phone numbers, email addresses, physical mailing address, SSNs, IP addresses, and so on), and may store related information (such as transcripts, recordings, or other historical information about video conferences for one or more of the registered agents). As discussed above, the verification system 210 may monitor video conference calls to determine whether participants purporting to be registered agents of the company are identified as actual registered agents of the company.

For example, the verification system 210 may monitor a video conference call between the agent device 230 and the customer device 240. During an in-progress video conference call, the agent device 230 may capture one or more images of a user of the agent device 230 purporting to be a specific registered agent. The agent device 230 may transform the one or more captured images into a facial encoding, and transmit the facial encoding to the verification system 210. In some aspects, the facial encoding of the user may be stored in the agent device 230. The verification system 210 may identify the stored facial encoding corresponding to the specific registered agent, and may compare the received facial encoding with the identified facial encoding of the specific registered agent to determine whether the user of the agent device 230 is the specific registered agent (or whether the user is pretending to be the specific registered agent).

If the user of the agent device 230 is not identified as the specific registered agent, a notification may be sent to the risk monitoring engine 250. For example, the verification system 210 may generate an alert which may be sent to the risk monitoring engine 250. Risk monitoring 250 may review the notification or alert. For example, risk monitoring engine 250 may include a human review console or dashboard, which may allow for human review of potential mismatches. Such review may allow a reviewer to determine whether or not the alert or notification was generated in error, and how to respond. In some implementations, the alert or notification may also increment a counter recording a number of times that a potential mismatch has been detected for the specific registered agent, as discussed above. In some implementations, it may be determined that the user of the agent device 230 is the specific registered agent, and that the potential mismatch indicated by the notification or alert was in error. For example, the specific registered agent may have new glasses, a new haircut, or other changes in appearance which caused the verification system 210 not to identify the user as the specific registered agent.

In some implementations, in response to the notification or alert being determined to be in error, the specific registered agent may be prompted to submit one or more new photographs from which new or updated facial encodings may be generated and stored in the agent profile database 220. If the notification or alert is determined not to be in error, and that the user of the agent device 230 is confirmed not to be the specific registered agent, then the risk monitoring engine 250 may perform one or more risk mitigation operations. Such risk mitigation operations may include flagging the account of the specific registered agent for suspension or termination, or as otherwise compromised, terminating the in-progress video conference call, rescinding one or more credentials of the specific registered agent, and so on.

As discussed above, verifying identities of agents in a video conference system is important. However, exchanging video or images captured during the video conference call between various components of the system may consume a sufficiently large amount of computing resources, such as CPU resources, memory, bandwidth, and so on. The consumption of such resources may limit the number of registered agents that can be monitored in real time during video conference calls with customers or clients of the company. It would therefore be desirable to verify the identities of registered agents in a video conference system in a manner that consumes fewer computational resources, which in turn may increase the scalability and decrease the cost of the identity verification system.

Accordingly, the example implementations allow an identity verification system to verify identities of registered users without requiring the transmission of relatively large captured image or video data to the verification system. In accordance with example implementations, this efficiency is achieved by exchanging one or more facial encodings of registered agents (or of persons purported to be registered agents) instead of video or image data captured during video conference calls. Appropriately constructed facial encodings may allow for accurate verification of registered agents in a manner that consumes less transmission bandwidth and less memory resources than conventional solutions that rely on actual image or video data captured during video conference calls. For example, appropriately selected facial encodings may be only a few kilobytes in size, whereas image or video data may be on the order of megabytes in size. Thus, exchanging facial encodings in accordance with various aspects of the present disclosure, rather than captured image or video data, may reduce the volume of exchanged data by three orders of magnitude (e.g., by 1000 times), or more.

Figure 3:
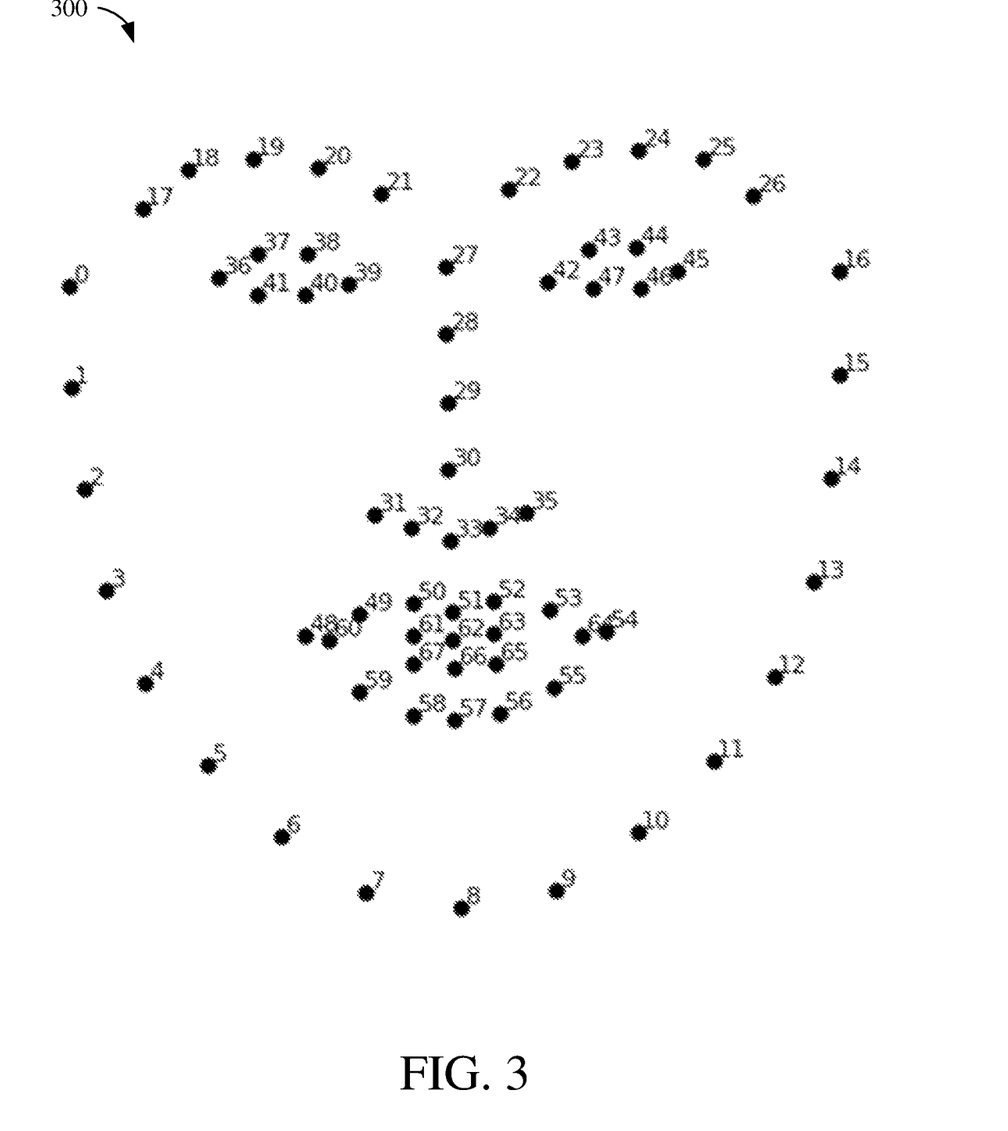
FIG. 3 shows an example landmark map showing one example set of facial landmarks which may be used for generating a facial encoding, according to some implementations.

In some implementations, the facial encoding may be based on determined positions of a specified number of ordered facial landmarks extracted from an image of a person. For example, a particular facial landmark may be located at the rightmost point of a person's left eye. FIG. 3 shows an example landmark map 300 showing one example set of facial landmarks which may be used for generating a facial encoding, according to some implementations. The landmark map 300 shows one example set of facial landmarks whose positions may be determined and used for constructing an example facial encoding. The example landmark map 300 may also be found at https://cdn-images-1.medium.com/max/1600/1*AbEg31EgkbXSQehuNJB1Wg.png. The example landmark map 300 of FIG. 3 includes an ordered series of a number (n) of facial landmarks, where n=68, and the facial landmarks are labeled with reference numbers 0-67. The example landmark map 300 is only one of a multitude of different landmark maps that may be used with the example implementations disclosed herein. In some other implementations, other landmark maps may be used which have a larger or a smaller number of facial landmarks, and which may be in any predetermined ordering.

In accordance with example implementations, facial landmarks may be extracted from captured image or video data using appropriate machine learning techniques such as an appropriate residual neural network (ResNet). Such machine learning implementations may be trained on a sufficiently large dataset of human faces to ensure a certain level of accuracy. For example, a registered agent may provide one or more images depicting a number of facial characteristics of the registered agent to the verification system when registering as an agent of the company, and the verification system may identify the positions of the facial landmarks in the landmark map, such as landmark map 300. Similarly, the agent device 230 may, during an in-progress video conference call, capture one or more images of the user of the agent device 230 and identify the position of each of the facial landmarks.

In some example implementations, a facial encoding may be based on a landmark vector, comprising an ordered list of the facial landmark positions. Determining such a landmark vector may include identifying a rectangular region of an image containing a human face and identifying the positions of each of the facial landmarks. In some implementations, the position of each respective landmark may be normalized based on the identified rectangular region of the image. For example, the rectangular region may be used to scale the horizontal and vertical position of each facial landmark. In one example, the leftmost edge of the rectangular region may be defined as horizontal position zero, the rightmost as horizontal position one, and the horizontal position of each landmark scaled as a value between zero and one based on its respective position within the rectangular region. Similar scaling may be applied to the vertical position of each facial landmark. Thus, the facial encoding may consider relative positions of the facial features rather than the absolute positions, which may be affected by a user's proximity to the camera, screen resolutions, and so on.

A landmark vector may thus be constructed, including a normalized and ordered series of facial landmark positions.

For the example landmark map 300 of FIG. 3, the landmark vector may include n=68 ordered (x,y) positions. For other landmark maps not shown for simplicity, the landmark vector may include other suitable numbers of ordered (x,y) positions. In some implementations, the landmark vector may be used as the facial encoding, while in some other implementations, the facial encoding may be generated by additional processing of the landmark vector, such as encryption, watermarking, the addition of one or more parity bits, and so on.

In accordance with some example implementations, two facial encodings may be compared by determining a distance between their respective landmark vectors. For the example landmark map 300 of FIG. 3, a similarity metric (M) for a first landmark vector V1 and a second landmark vector V2 may be determined based on a Euclidean distance between V1 and V2, such that:

$$M = \sqrt{\sum_{j=0}^{67}(V1j - V2j)^2/n},$$

where V1j and V2j are the respective $j^{th}$ elements of V1 and V2.

In some implementations, two facial encodings may be considered as a match when the similarity metric indicates at least a threshold similarity between the two facial encodings. For example, for the Euclidean distance metric described above, two landmark vectors V1 and V2 may have a threshold similarity when the distance between them is less than or equal to a threshold distance. Consequently, a potential mismatch may be detected when two facial encodings have less than a threshold similarity, or a distance greater than a threshold distance between their respective landmark vectors.

Figure 4:
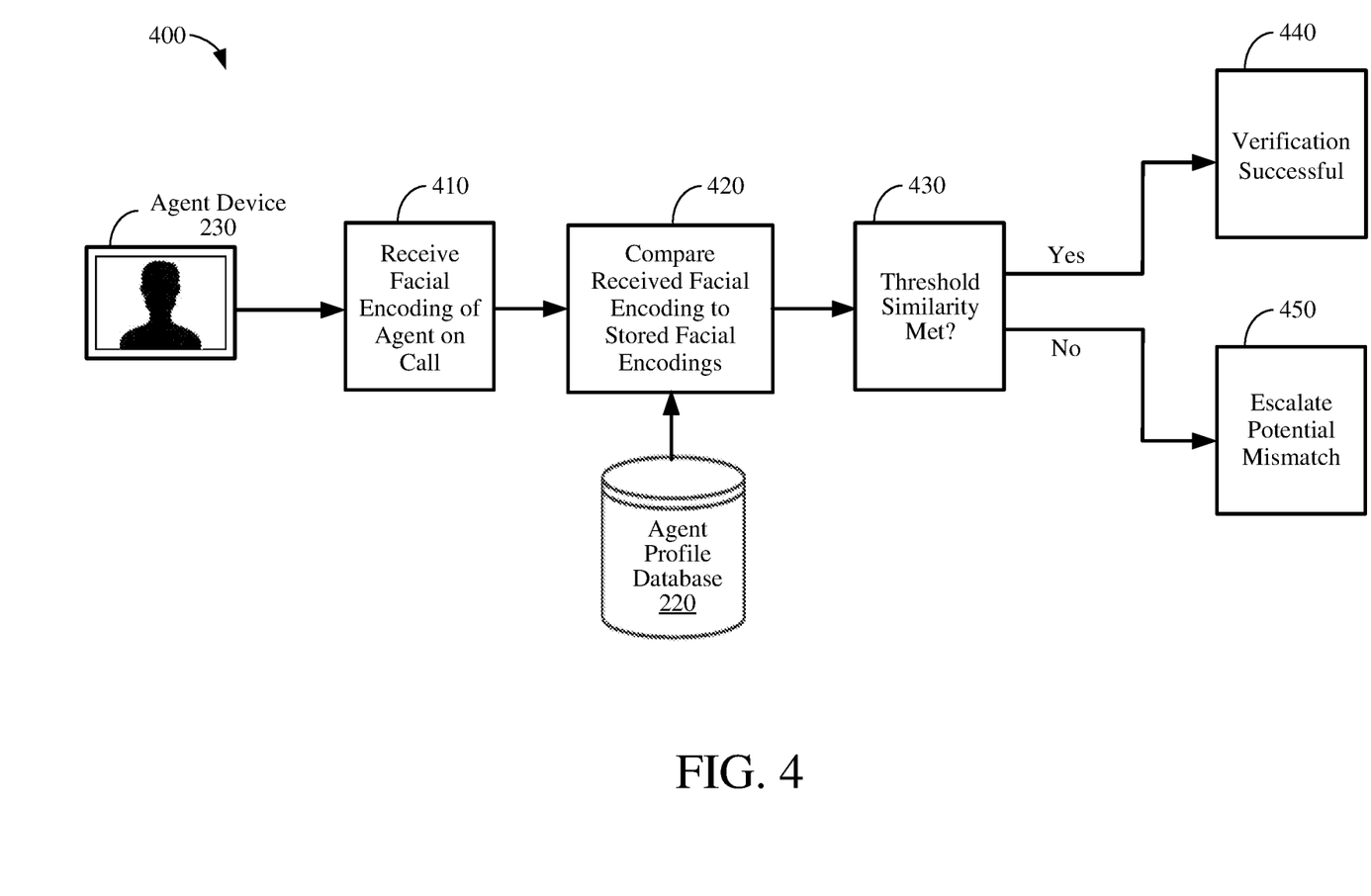
FIG. 4 shows a high-level overview of an example process flow that may be employed by the verification system of FIG. 1.

FIG. 4 shows a high-level overview of an example process flow 400 that may be employed by the verification system 100 of FIG. 1. In block 410, a facial encoding is received from an agent device 230, the facial encoding purporting to correspond to a specific registered agent of the company using the video conference system. For example, the facial encoding may be generated by and received from the agent device 230 during an in-progress video conference call that a user purporting to be the specific registered agent is scheduled to participate in. At block 420, one or more stored facial encodings associated with the specific registered agent are retrieved from the agent profile database 220. As discussed above, in some implementations, the agent profile database 220 may be part of the database 120 of FIG. 1. The facial encoding received from the agent device 230 is compared to the one or more stored facial encodings, and a similarity metric may be determined based on the comparison. At block 430, a decision is made whether the received facial encoding is sufficiently similar to the one or more stored facial encodings to verify that the person purporting to be a specific registered agent is in fact the specific registered agent. Such a decision may be based at least in part on a similarity metric, such as a similarity metric between a received landmark vector corresponding to the received facial encoding, and a stored landmark vector corresponding to the one or more stored facial encodings. In some implementations, the similarity metric may be based on a Euclidean distance between the two landmark vectors, as discussed above.

If the similarity metric indicates at least a threshold similarity, then the process flow 400 may proceed to block 440, where the verification is determined to be successful, indicating that the person purporting to be the specific registered agent is identified to be the specific registered agent. If the similarity metric does not indicate the threshold similarity, then a potential mismatch is detected for escalation at block 450. For example, if the similarity metric is a Euclidean distance between two landmark vectors, a potential mismatch may be detected when there is at least a threshold distance between the received landmark vector and the stored landmark vector. One or more notifications or alerts may be generated in response to the detection of such a potential mismatch, as discussed above.

Figure 5:
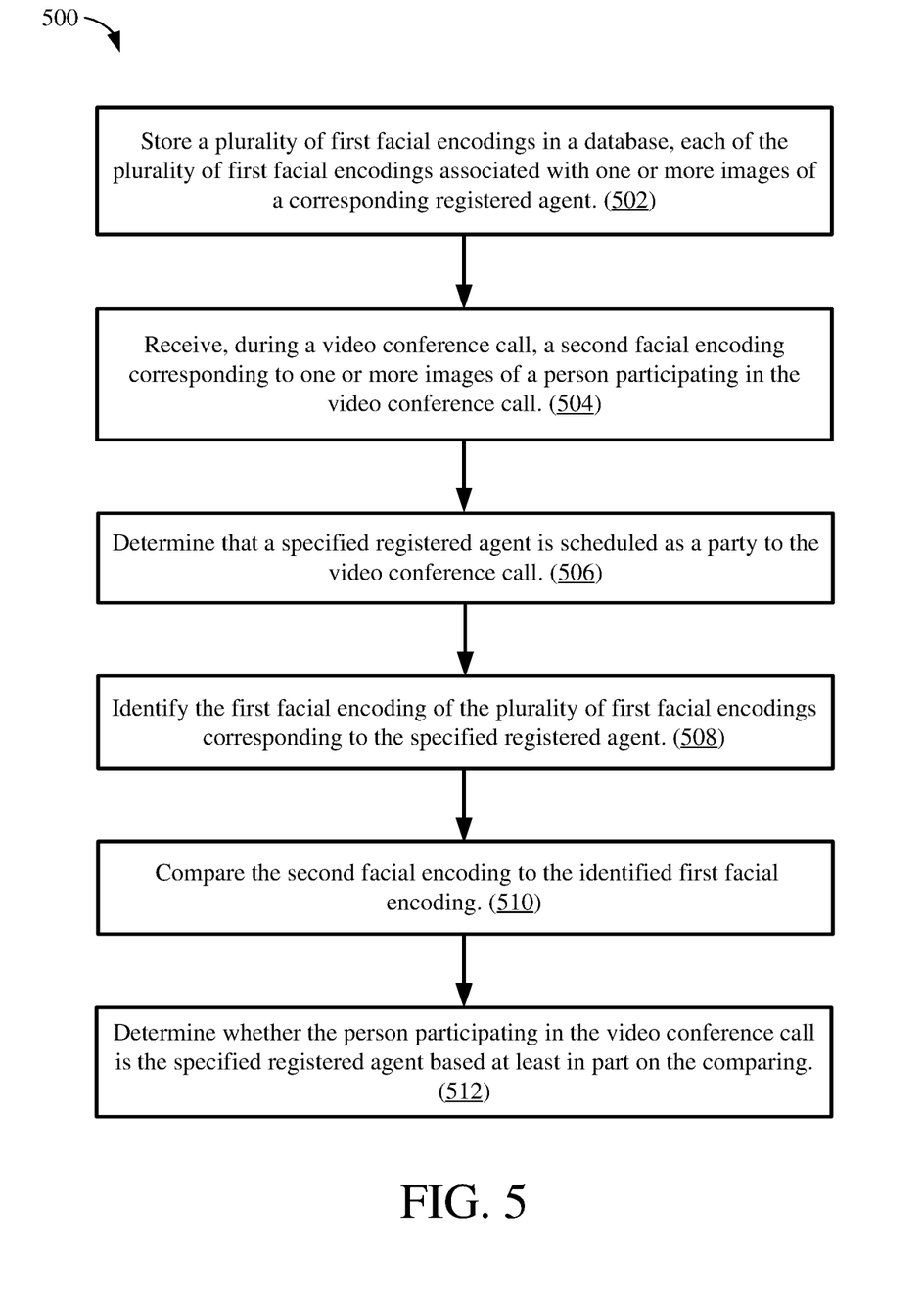
FIG. 5 shows an illustrative flow chart depicting an example operation for verifying identities of parties to a video conference call, according to some implementations.

FIG. 5 shows an illustrative flow chart depicting an example operation 500 for verifying identities of parties to a video conference call, according to some implementations. The example operation 500 may be performed by one or more processors of an identity verification system. In some implementations, the example operation 500 may be performed using the verification system 100 of FIG. 1 or the verification system 210 of FIG. 2. It is to be understood that the example operation 500 may be performed by any suitable systems, computers, or servers.

At block 502, the verification system 100 stores a plurality of first facial encodings in a database, each of the plurality of first facial encodings associated with one or more images of a corresponding registered agent. At block 504, the verification system 100 receives, during a video conference call, a second facial encoding associated with one or more images of a person participating in the video conference call. At block 506, the verification system 100 determines that a specified registered agent is scheduled as a party to the video conference call. At block 508, the verification system 100 identifies the first facial encoding of the plurality of first facial encodings corresponding to the specified registered agent. At block 510, the verification system 100 compares the second facial encoding to the identified first facial encoding. At block 512, the verification system 100 determines whether the person participating in the video conference call is the specified registered agent based at least in part on the comparing.

In some implementations, the one or more images of the person may not be received at the verification system 100 if the person is identified as the specified registered agent. In some implementations, each facial encoding of the first facial encodings and the second facial encoding may be based at least in part on determined positions of a number of facial landmarks extracted from one or more images of a corresponding person. In some implementations, each facial encoding may be based on a normalized vector comprising the determined positions of the number of facial landmarks. In some aspects, the number of facial landmarks may be n=68. In other aspects, the number of facial landmarks may be greater than n=68. In some other aspects, the number of facial landmarks may be less than n=68.

In some implementations, identifying the first facial encoding corresponding to the specified registered agent in block 508 may include retrieving the identified first facial encoding from the database 120. In some implementations, comparing the second facial encoding to the identified first facial encoding in block 510 may include determining a similarity metric based on the second facial encoding and the identified the first facial encoding. In some implementations, the similarity metric may be based on a distance between a normalized vector corresponding to the second facial encoding and a normalized vector corresponding to the identified first facial encoding.

In some implementations, the person may be verified as the specified registered agent in block 512 when the distance is determined to be less than a threshold distance, and may not be verified as the specified registered agent in block 512 when the distance is determined to be greater than or equal to the threshold distance.

The operation 500 may also include generating an alert in response to determining that the person is not the specified registered agent in block 512. In some implementations, the alert may include one or more images of the person, the person's IP address, an identifier of the person's device, or any combination thereof. The alert may flag the video conference call for human verification that the person is the specified registered agent. In some implementations, generating the alert may include requesting the one or more images of the person associated with the second facial encoding, receiving the one or more images, and including the one or more images of the person in the alert.

Figure 6:
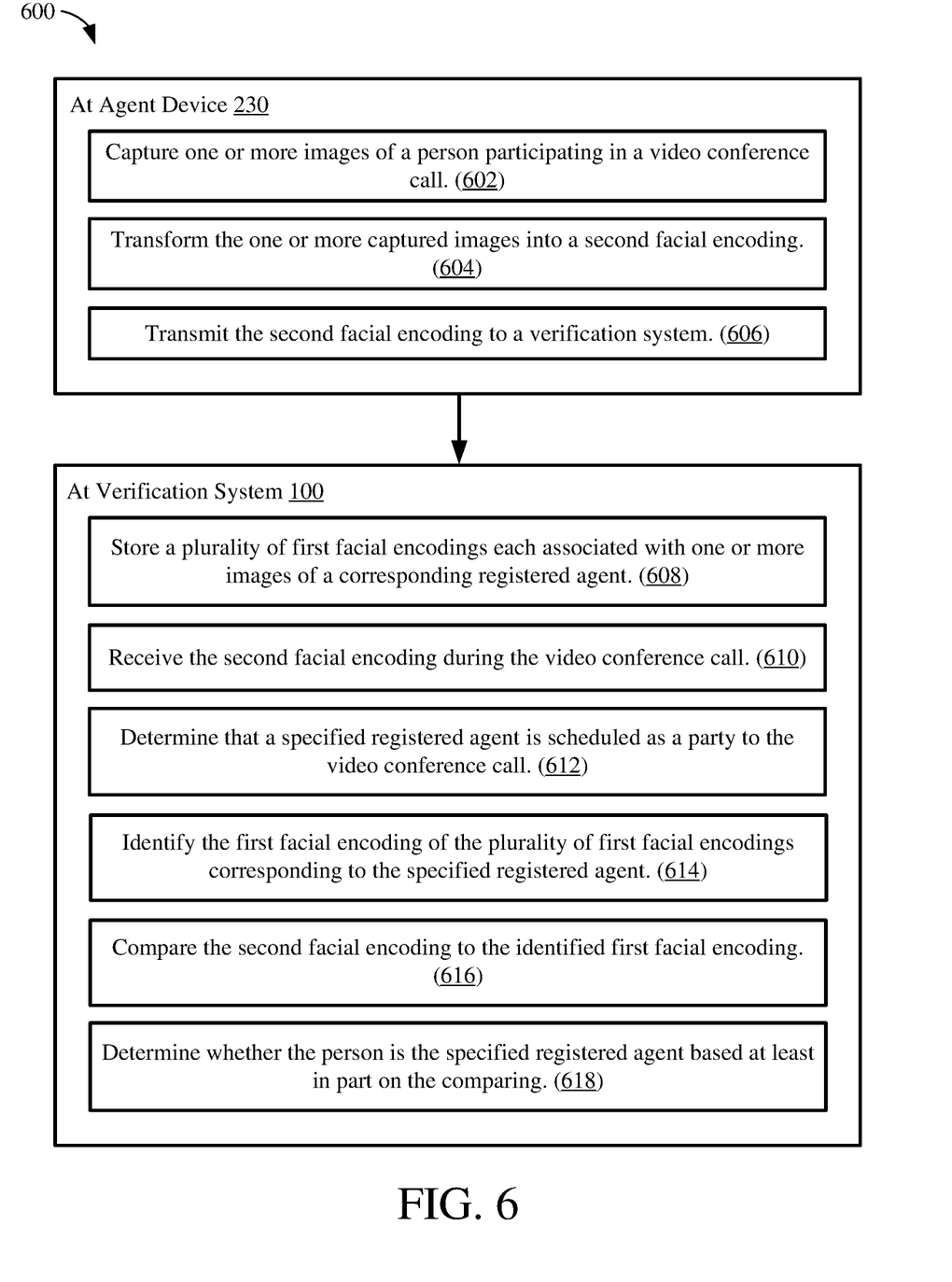
FIG. 6 shows an illustrative flow chart depicting an example operation for verifying identities of parties to a video conference call, according to some implementations.

FIG. 6 shows an illustrative flow chart depicting an example operation 600 for verifying identities of parties to a video conference call, according to some implementations. The example operation 600 may be performed by one or more devices in a video conference system. In some implementations, the example operation 600 may be performed using the video conference system 200 of FIG. 2. It is to be understood that the example operation 600 may be performed by any suitable systems, computers, or servers.

The operation 600 may include steps performed at an agent device 230, and steps performed at a verification system 100. At block 602, the agent device 230 may capture one or more images of a person participating in a video conference call. At block 604, the agent device 230 may transform the one or more captured images into a second facial encoding. At block 606, the agent device 230 may transmit the second facial encoding to the verification system 100.

At block 608, the verification system 100 may store a plurality of first facial encodings in a database, each of the plurality of first facial encodings associated with one or more images of a corresponding registered agent. At block 610, the verification system 100 may receive the second facial encoding during the video conference call. At block 612, the verification system 100 may determine that a specified registered agent is scheduled as a party to the video conference call. At block 614, the verification system 100 may identify the first facial encoding of the plurality of first facial encodings corresponding to the specified registered agent. At block 616, the verification system 100 may compare the second facial encoding to the identified first facial encoding. At block 618, the verification system 100 may determine whether the person is the specified registered agent based at least in part on the comparing.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for verifying identities of parties to a video conference call, the method performed by one or more processors of a verification system including an agent profile database and comprising:
    storing a plurality of first facial encodings in the agent profile database, each of the plurality of first facial encodings associated with one or more images of a corresponding registered agent of a plurality of registered agents associated with the verification system;
    receiving, during the video conference call, a second facial encoding associated with one or more images of a person participating in the video conference call, the second facial encoding received from a device with which the person uses to participate in the video conference call;
    determining that a specified registered agent is scheduled as a party to the video conference call;
    identifying, among the plurality of first facial encodings stored in the agent profile database, a first facial encoding corresponding to the specified registered agent;
    comparing the second facial encoding to the identified first facial encoding; and
    determining whether the person is the specified registered agent based at least in part on the comparing.

2. The method of claim 1, wherein each of the plurality of first facial encodings is based at least in part on determined positions of a number of ordered facial landmarks extracted from the one or more images of the corresponding registered agent, and the second facial encoding is based at least in part on determined positions of a number of ordered facial landmarks extracted from the one or more images of the person participating in the video conference call.

3. The method of claim 2, wherein each of the plurality of first facial encodings is based on a normalized vector comprising the determined positions of the number of ordered facial landmarks extracted from the one or more images of the corresponding registered agent, and the second facial encoding is based on a normalized vector comprising the determined positions of the number of ordered facial landmarks extracted from the one or more images of the person participating in the video conference call.

4. The method of claim 3, wherein determining whether the person is the specified registered agent comprises determining a distance between a normalized vector corresponding to the second facial encoding and a normalized vector corresponding to the identified first facial encoding.

5. The method of claim 4, further comprising identifying the person as the specified registered agent if the determined distance is less than a threshold distance.

6. The method of claim 1, further comprising generating an alert in response to determining that the person is not the specified registered agent.

7. The method of claim 6, wherein the alert includes at least one of the one or more images of the person, an IP address of the person, or an identifier of the device with which the person uses to participate in the video conference call.

8. The method of claim 6, wherein the alert flags the video conference call for human verification that the person is the specified registered agent.

9. The method of claim 6, wherein generating the alert comprises:
    receiving, from the device with which the person uses to participate in the video conference call, the one or more images of the person; and
    including the one or more received images of the person in the alert.

10. The method of claim 1, wherein the one or more images of the person are not received at the verification system if the person is identified as the specified registered agent.

11. A system for verifying identities of parties to a video conference call, the system including an agent profile database and comprising:
    one or more processors; and
    a memory storing instructions that, when executed by the one or more processors, cause the system to perform operations comprising:
        storing a plurality of first facial encodings in the agent profile database, each of the plurality of first facial encodings associated with one or more images of a corresponding registered agent of a plurality of registered agents associated with the verification system;
        receiving, during the video conference call, a second facial encoding associated with one or more images of a person participating in the video conference call, the second facial encoding received from a device with which the person uses to participate in the video conference call;
        determining that a specified registered agent is scheduled as a party to the video conference call;
        identifying, among the plurality of first facial encodings stored in the agent profile database, a first facial encoding corresponding to the specified registered agent;
        comparing the second facial encoding to the identified first facial encoding; and
        determining whether the person is the specified registered agent based at least in part on the comparing.

12. The system of claim 11, wherein each of the plurality of first facial encodings is based at least in part on determined positions of a number of ordered facial landmarks extracted from the one or more images of the corresponding registered agent, and the second facial encoding is based at least in part on determined positions of a number of ordered facial landmarks extracted from the one or more images of the person participating in the video conference call.

13. The system of claim 12, wherein each of the plurality of first facial encodings is based on a normalized vector comprising the determined positions of the number of ordered facial landmarks extracted from the one or more images of the corresponding registered agent, and the second facial encoding is based on a normalized vector comprising the determined positions of the number of ordered facial landmarks extracted from the one or more images of the person participating in the video conference call.

14. The system of claim 13, wherein execution of the instructions to determine whether the person is the specified registered agent further causes the system to determine a distance between a normalized vector corresponding to the second facial encoding and a normalized vector corresponding to the identified first facial encoding.

15. The system of claim 14, wherein execution of the instructions further causes the system to identify the person as the specified registered agent if the determined distance is less than a threshold distance.

16. The system of claim 11, wherein execution of the instructions further causes the system to generate an alert in response to determining that the person is not identified as the specified registered agent.

17. The system of claim 16, wherein the alert includes at least one of the one or more images of the person, an IP address of the person, or an identifier of the device with which the person uses to participate in the video conference call.

18. The system of claim 16, wherein the alert flags the video conference call for human verification that the person is the specified registered agent.

19. The system of claim 11, wherein the one or more images of the person are not received by the system if the person is identified as the specified registered agent.

20. A video conference system for verifying identities of parties to a video conference call, the system comprising:
- a video capture device configured to capture one or more images of a person participating in the video conference call and to transform the one or more captured images into a second facial encoding; and
- a verification system including an agent profile database and configured to:
    - store a plurality of first facial encodings in the agent profile database, each of the plurality of first facial encodings associated with one or more images of a corresponding registered agent of a plurality of registered agents associated with the verification system;
    - receive the second facial encoding from the video capture device during the video conference call, the second facial encoding received from the video capture device;
    - determine that a specified registered agent is scheduled as a party to the video conference call;
    - identify, among the plurality of first facial encodings stored in the agent profile database, a first facial encoding corresponding to the specified registered agent;
    - compare the second facial encoding to the identified first facial encoding; and
    - determine whether the person is the specified registered agent based at least in part on the comparing.

* * * * *